March 13, 1928. 1,662,294
R. BETTINARDI
TIRE LOCK
Filed April 18, 1927
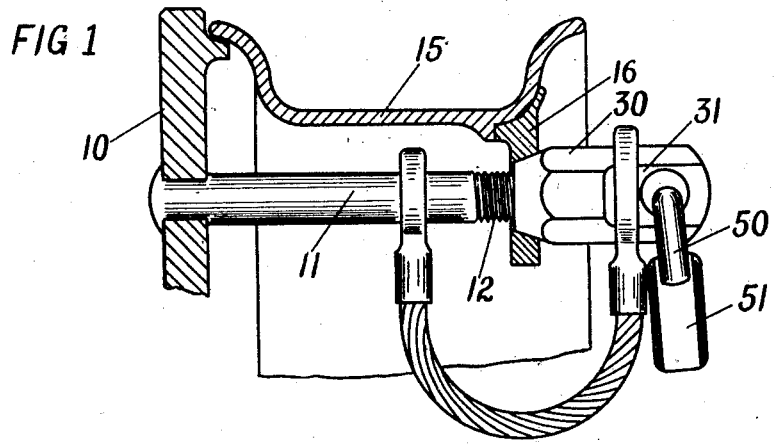
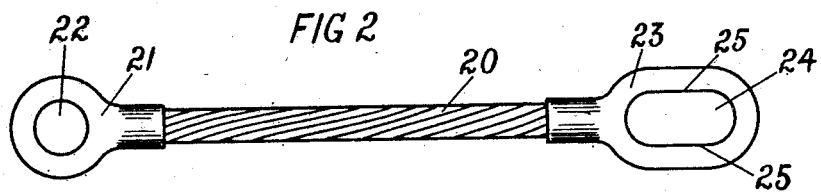
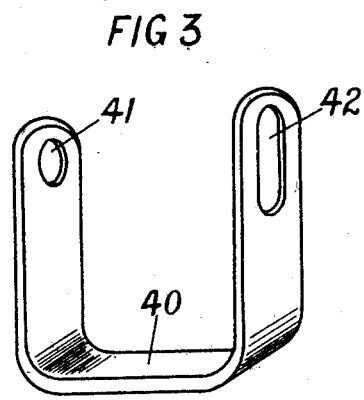
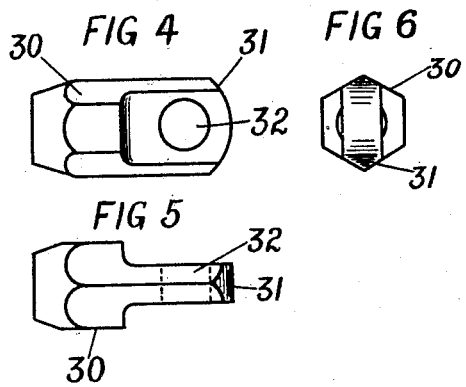
ROBERT BETTINARDI.
INVENTOR
BY *[signature]*
HIS ATTORNEY Patented Mar. 13, 1928.

1,662,294

UNITED STATES PATENT OFFICE.

ROBERT BETTINARDI, OF NEWARK, NEW JERSEY.

TIRE LOCK.

Application filed April 18, 1927. Serial No. 184,662.

The invention relates to tire locks and more particularly to devices used for locking spare rim and its tire on carriers provided for the purpose on all automobiles and has for its object to produce a cheap, efficient and easily operated lock which can be applied to any standard tire carrier and lock thereon the spare tire and its carrying rim.

The foregoing and other features of my invention will now be described in connection with the accompanying drawing forming part of this specification in which I have represented my tire lock in its preferred form after which I shall point out in the claims those features which I believe to be new and of my own invention.

In the drawings:—

Figure 1 is a side view of my tire lock shown in position on a tire carrier. The tire carrier and the spare rim are shown in part section.

Figure 2 is a detail of my flexible member showing the round eye on one end and the elongated eye with parallel sides on the other end.

Figure 3 is a modified form of the member shown in Figure 2 which construction is used if the member is rigid.

Figure 4 is a side view of my cap nut.

Figure 5 is a side view of my cap nut at right angles to that shown in Figure 4.

Figure 6 is an end view of my cap nut.

In the carrying out of my invention I avail myself of any standard tire carrier common to automobiles. For the purpose of this description I have indicated a part of such standard tire carrier as 10 provided with its fastening stud 11 threaded at 12. This is common to all carriers and requires no further description here. The tire carrier is adapted to hold a rim, shown in section as 15, said rim may be of the type that has integral lugs 16 or one without integral lugs in which case a member or lugs 16 may be used as a separate piece.

In the preferred embodiment of my invention I employ a member 20 made of flexible cable or a length of hardened chain, with an eye 21 secured on one end provided with a hole 22 large enough to slip over the stud 11 before the rim 15 and its lug 16 is put on the tire carrier 10. The other end of the member 20 is provided with an eye 23 having an elongated hole or slot 24 therein. The sides 25 of this slot are parallel and of such a distance apart that the extension 31 of the cap nut 30 will pass but not turn therebetween.

While I prefer to make the member 20 out of flexible cable it may also be fashioned out of a short length of chain or be made of metal and rigid, in which event it takes the form shown in Figure 3 in which the member 40 is U shape with a round hole 41 in one leg and a slot 42 in the opposite leg.

I also employ a cap nut 30 adapted to engage the screw threaded portion of stud 11. This nut is provided with a cap in the form of an extension 31 provided with a section that is adapted to pass through the hole 24 in the eye 23. A transverse hole 32 is provided in the extension in which to pass the bow 50 of the lock 51.

The operation of my device is as follows:—

The round eye 21 of member 20 is placed over the stud 11 of the tire carrier. The spare tire with its rim 15 is put in place on the carrier as shown in Figure 1. If the rim 15 is of the type having integral lugs, one of these lugs 16 is slipped over the stud. If the rim does not carry integral lugs a lug 16 is provided and put in place against the rim. The cap nut 30 is then screwed on the thread 12 tight against the lug securely holding the rim on the carrier and the end of the member 20 carrying the eye with the elongated slot is slipped over the extension of the cap nut and the lock snapped tight, all as shown in Figure 1.

I wish it distinctly understood that my tire lock herein illustrated and described is in the form in which I desire to construct it and that changes or modifications can be made as may be convenient or desirable without departing from the salient features of the invention and I therefore intend the following claims to cover such modifications as naturally fall within the lines of invention.

I claim:—

1. A tire lock in combination with a tire carrier provided with a screw threaded stud and a demountable rim to be carried thereon, a cap nut provided with a substantially rectangular cap extension provided with a transverse eye, said nut adapted to engage the screw threaded portion of the carrier stud, a flexible member provided on one end with a round eye adapted to go on the stud before the rim is placed on the carrier and on the opposite end with an elongated eye adapted to engage the substantially rectangular portion of the cap nut after it is assembled on the carrier stud in holding position, a lock adapted to engage the eye in cap nut after the flexible connection is in assembled position whereby the cap nut is prevented from turning on the stud.

2. In a tire lock of the class described a member provided on one end with a round eye and on the other end with an elongated eye, a cap nut for the bolt member provided with an elongated cap integral therewith adapted to be engaged by the rectangular end of the flexible member, means carried by the cap nut to provide for locking the flexible member on the nut.

In testimony whereof I affix my signature.

ROBERT BETTINARDI.